(12) United States Patent
Tormoen

(10) Patent No.: US 7,841,249 B2
(45) Date of Patent: Nov. 30, 2010

(54) FLUIDIZED SENSOR FOR MAPPING A PIPELINE

(75) Inventor: Garth W. Tormoen, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 257 days.

(21) Appl. No.: 11/774,939

(22) Filed: Jul. 9, 2007

(65) Prior Publication Data

US 2008/0041173 A1 Feb. 21, 2008

Related U.S. Application Data

(60) Provisional application No. 60/819,690, filed on Jul. 10, 2006.

(51) Int. Cl.
F16L 55/48 (2006.01)
G01M 19/00 (2006.01)

(52) U.S. Cl. ..................... 73/866.5; 73/865.9

(58) Field of Classification Search ................ 73/866.5, 73/1.18, 488, 503, 503.3, 514.01, 865.9; 702/150; 15/104.061
See application file for complete search history.

(56) References Cited

U.S. PATENT DOCUMENTS

| | | | |
|---|---|---|---|
| 3,056,303 | A | 10/1962 | Naylor |
| 3,212,340 | A | 10/1965 | Benckert |
| 4,345,473 | A | 8/1982 | Berni |
| 5,046,056 | A | 9/1991 | Sallas et al. |
| 5,126,980 | A | 6/1992 | Sallas et al. |
| 5,485,148 | A * | 1/1996 | Tseng ..................... 340/10.41 |
| 6,261,247 | B1 | 7/2001 | Ishikawa et al. |
| 6,324,904 | B1 | 12/2001 | Ishikawa et al. |

(Continued)

OTHER PUBLICATIONS

Paste Systems, Inc., "Systems helps quantify pipe friction losses.", Oil & Gas Journal, Apr. 30, 2001, Equipment/Software/Literature; p. 121, PennWell Publishing Company.

(Continued)

*Primary Examiner*—Hezron Williams
*Assistant Examiner*—Nathaniel Kolb
(74) *Attorney, Agent, or Firm*—Navarro Law Office PC; Arthur L Navarro

(57) ABSTRACT

A system for facilitating the mapping of a partially or fully occluded (hidden) pipeline containing a gas, a liquid, or a liquid-gas mixture. The system includes a sensor device having an internal sphere with a generally smooth outer surface and an internal orientation stabilizer. Within the internal sphere are contained a tri-axial inertial sensor, a time keeping device, a data processing device, a data recording device, and a power source. The internal sphere is centered and held within an external sphere having an inside diameter that is incrementally larger than the outside diameter of the internal sphere. The external sphere has a generally smooth unobstructed inner surface and fully encloses the internal sphere. A quantity of fluid fills the spatial gap between the outside surface of the inside sphere and the inside surface of the external sphere in a manner that permits omni-directional free rotational movement of the internal sphere within the external sphere. The use of the sensor involves the process of downloading data that has been stored within the data recording device of the internal sphere after it has traveled its path through the pipeline to be mapped.

10 Claims, 3 Drawing Sheets

U.S. PATENT DOCUMENTS

| | | | |
|---|---|---|---|
| 6,453,745 | B1 | 9/2002 | Jalkanen |
| 6,642,906 | B1 * | 11/2003 | Machalek ................. 343/872 |
| 6,679,118 | B1 | 1/2004 | Esashi et al. |
| 6,745,833 | B2 | 6/2004 | Aronstam et al. |
| 6,814,179 | B2 | 11/2004 | Corrigan et al. |
| 6,935,425 | B2 | 8/2005 | Aronstam |
| 2005/0076724 | A1 * | 4/2005 | Boudreaux ................. 73/866.5 |

OTHER PUBLICATIONS

Carrickfergus, "Pig detection device speeds repairs on damaged pipelines", Offshore, Oct. 1998, Pipeline Tracking; p. 191, PennWell Publishing Company.

Cordell, J.L., "In-line inspection: what technology is best? pipeline inspection", Pipe Line Industry, Jul. 1991, vol. 74; No. 7; p. 47; ISSN: 0032-0145, Information Access Company, a Thomson Corporation Company, Gulf Publishing Company.

Griesser, L.; Wieland, M.; Walder, R., "Earthquake detection and safety system for oil pipelines; Software Benefits", Pipeline & Gas Journal, Dec. 1, 2004, No. 12, vol. 231; p. 44; ISSN: 0032-0188, Gale Group, Inc., Oildom Publishing Company of Texas, Inc.

* cited by examiner

FLUIDIZED SENSOR FOR MAPPING A PIPELINE

CROSS REFERENCE TO RELATED APPLICATIONS

This application claims the benefit under Title 35 United States Code §119(e) of U.S. Provisional Application No. 60/819,690 filed Jul. 10, 2006, the full disclosure of which is incorporated herein by reference.

BACKGROUND OF THE INVENTION

1. Field of the Invention

The present invention relates generally to methods and systems for mapping the geographic position and path of conduits and pipelines. The present invention relates more specifically to an apparatus and an associated method for internally following, tracking, and recording the position and path of a pipeline or conduit with a free-moving motion and orientation sensor.

2. Description of the Related Art

Underground pipelines make up a vast network of conduits carrying a wide range of materials within and between all countries of the world through all types of terrain. While some such pipelines and conduits are exposed to view, most are buried in the ground or under other manmade structures such that they are occluded from view. Economies rely heavily on the proper functioning of these pipelines, especially as they supply energy materials, such as oil and gas, to locations remote from the production of the materials. In many instances, as a pipeline corrodes, it becomes necessary to repair or replace segments of the pipeline. In most cases, when this occurs, the pipeline must be uncovered to identify and locate that portion of the pipeline that requires repair. A major obstacle to this task, for the majority of pipelines that are occluded from view, is knowing where to dig or otherwise uncover the pipeline, as the location of the pipeline is often unknown or inaccurately recorded. It therefore becomes desirable, if not essential, to map the pipeline's location for the most accurate and efficient effort at locating and exposing the pipe for later repair.

Various systems have been developed for the inspection of pipelines using sensors designed to travel inside the pipe and to carry out a variety of measurements on the characteristics of the pipe walls and the overall integrity of the conduit system. Some of these sensor systems are designed to move "freely" within a pipe such as on wheeled carts and the like, sized and structured to travel along the length of the pipe, within the typically circular cross-section with or without the fluid or gas inside the pipe. A group of such systems are referred to generically as "pigs" or pipeline inspection gauges.

Inertial sensors have been placed on pigs (pipelines inspection gauges) in the past, primarily to track and determine changing elevations in a pipeline path. Examples of such systems are disclosed in a number of issued U.S. patents including the following:

U.S. Pat. No. 6,243,657 issued to Tuck et al. entitled Method and Apparatus for Determining Location of Characteristics of a Pipeline, describes a pipeline inspection and defect mapping system utilizing a pig with an inertial measurement component and a pipeline inspection component for defect detection. The system also utilizes several magnetic logging devices positioned at precisely known locations along the pipeline for interaction with the pig as it passes through the pipe. Post processing incorporates data from the logging devices and the pig based sensor, primarily to derive the location of the detected defects.

U.S. Pat. Nos. 6,553,322 and 6,768,959, each issued to Ignagni and each entitled Apparatus and Method for Accurate Pipeline Surveying, describe a pipeline surveying system that includes a pipeline pig operable in conjunction with a previously determined global positioning system survey. The pig utilizes an inertial measurement unit and correlates the measured profile with the GPS survey.

These previously utilized approaches, however, are limited, in that the pigs are typically wheeled carts, and therefore have limits as to where and how they may propagate through the pipeline. Sharp angled turns, valve structures, and other such internal "obstructions" often prevent the easy movement of a wheeled or track based pig within the pipe. Such systems therefore often only yield a vertical profile of a pipe, typically over a long generally straight distance.

Other efforts in the industry have focused on miniaturized sensor systems capable of movement in conjunction with the gas or fluid flow through a conduit, pipeline, or borehole environment. Examples of these systems include those described in U.S. Pat. No. 6,324,904 issued to Ishikawa et al. entitled Miniature Pump Through Sensor Modules; U.S. Pat. No. 6,935,425 issued to Aronstam entitled Method for Utilizing Microflowable Devices for Pipeline Inspections; U.S. Pat. No. 6,745,833 issued to Aronstam et al. entitled Method of Utilizing Flowable Devices in Wellbores; and U.S. Pat. No. 6,814,179 issued to Corrigan et al. entitled Seismic Sensing Apparatus and Method with High-G Shock Isolation.

In addition, a number of efforts have been made in the past to configure sensors that may be allowed to freely move through pipeline systems and carry out some type of inspection or monitoring of the pipeline walls or contents. Examples of such efforts include U.S. Pat. No. 5,485,148 issued to Tseng entitled Pipeline Fluid Travel Monitoring System; U.S. Pat. No. 5,126,980 issued to Sallas et al. entitled Self-Orienting Vertically Sensitive Accelerometer; U.S. Pat. No. 3,212,340 issued to Benckert entitled Inertial Double Integrating Accelerometer; U.S. Pat. No. 6,453,745 issued to Jalkanen entitled Sensor Device for the Three-Dimensional Measurement of an Attitude or Acceleration; and U.S. Pat. No. 6,261,247 issued to Ishikawa et al. entitled Position Sensing System.

Some efforts in the past to generally measure the motion of an object with inertial references have utilized sensors with a "sphere-in-sphere" construction. Examples of some of these systems include those described in U.S. Pat. No. 3,056,303 issued to Naylor entitled Hydraulically and Spherically Supported Inertial Reference (the external sphere is fixed to a vehicle frame); U.S. Pat. No. 4,345,473 issued to Bernie entitled Vertical Component Accelerometer; U.S. Pat. No. 5,046,056 issued to Sallas et al. entitled Self-Orienting Vertically Sensitive Accelerometer; and U.S. Pat. No. 6,679,118 issued to Esashi et al. entitled Accelerometer and Spherical Sensor Type Measuring Instrument. The detailed disclosures of each of these prior U.S. patents are incorporated herein by reference.

All of the efforts in the past have generally failed to provide a fully self contained sensor system capable of free motion within a pipeline, that can create a record of orientation and motion sufficient to produce positional information (with respect to time) from which a map of the pipeline might be generated. The systems previously utilized either combine the movable sensor with fixed sensors or reference triggers along the path of the pipe (which of course requires some clear knowledge of the location of the pipeline) or involve sensors that must travel on frames that are incapable of easily traversing the internal obstructions typically associated with oil and gas pipelines or the like.

It would be desirable to have a freely moving sensor of the sphere-in-sphere configuration where both spherical structures were free to move within the confines of a pipeline, and where the orientation and position of at least one part of the sensor could be constantly tracked. It would be desirable if one part of the sensor could readily "absorb" the tumbling motion experienced by the sensor system as a whole and allow a remaining part of the sensor system to maintain a stable (measurable) orientation such that sensor components might track changes in the orientation and position of the sensor system as a whole.

SUMMARY OF THE INVENTION

The present invention describes the use of a tri-axial inertial sensor of a type commercially available, that is mounted on a fluidized vehicle (such as for example, on a Motes® platform from Crossbow Technologies, Inc.). The platform constructed in the present invention thereby allows for virtually unlimited propagation, as it is substantially smaller than most traditional pigs. In addition, the sensor system of the present invention does not need to travel on wheels or tracks, and therefore may extend its application outside of pipelines or bounded systems. A further advantage of the present invention is its ability to use a true tri-axial inertial sensor, which yields a three-dimensional profile of the pipeline, as opposed to sensor systems designed only to track variations in pipeline elevation (motion in only a vertical axis).

The present invention therefore provides an apparatus for facilitating the mapping of an occluded pipeline containing a gas, a liquid, or a liquid-gas mixture. The system includes a sensor device having an internal sphere with a generally smooth outer surface and an internal orientation stabilizer. Within the internal sphere are contained a tri-axial inertial sensor, a time keeping device, a data processing device, a data recording device, and a power source. The internal sphere is centered and held within an external sphere having an inside diameter that is incrementally larger than the outside diameter of the internal sphere. The external sphere has a generally smooth, unobstructed inner surface and fully encloses the internal sphere. A quantity of fluid fills the spatial gap between the outside surface of the internal sphere and the inside surface of the external sphere in a manner that permits omni-directional free rotational movement of the internal sphere within the external sphere. The use of the sphere-in-sphere sensor involves the process of downloading data that has been stored within the data recording device of the internal sphere after it has traveled its path through the pipeline to be mapped.

DETAILED DESCRIPTION OF THE PREFERRED EMBODIMENTS

Figure 1:
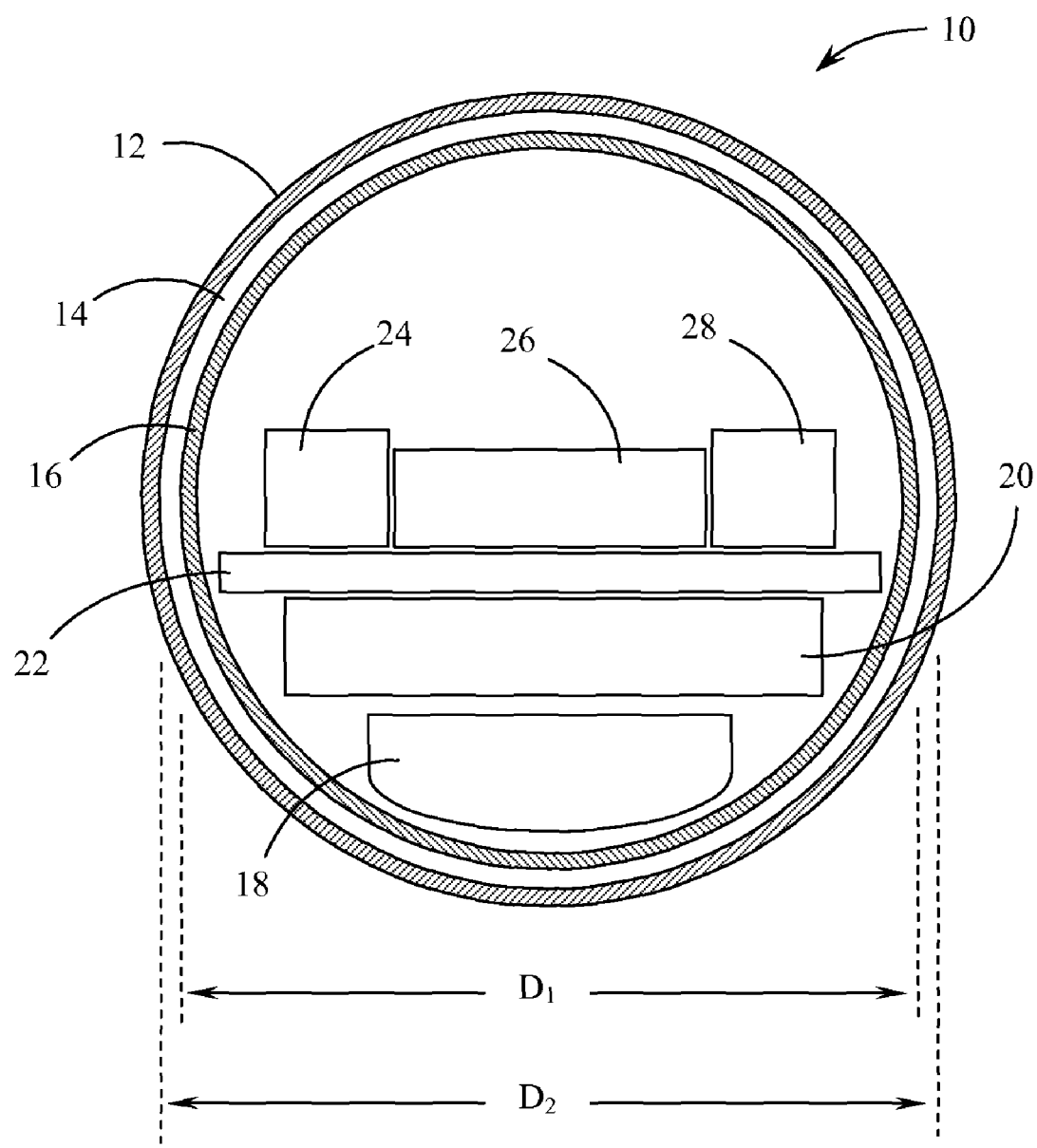
FIG. 1 is a cross-sectional view of the sphere-in-sphere sensor structure of the present invention.

As indicated above, the present invention utilizes a tri-axial inertial sensor mounted on a fluidized vehicle that may flow freely within the pipeline to be mapped. Referring first to FIG. 1, the sensor is shown to include an internal sphere with an outside diameter defined by a generally smooth, unobstructed outer surface. Included in association with the internal sphere is an internal orientation stabilizer described in more detail below. In addition, the internal sphere encloses a tri-axial inertial sensor, a time keeping device, a data processing device, a data recording device, and a power source.

In FIG. 1, fluidized sensor 10 is shown to comprise a sphere-in-sphere configuration enclosing a number of electronic devices and structures inside the internal sphere. Fluidized sensor 10 therefore comprises external sphere 12 which fully encloses internal sphere 16. A relatively small spatial gap is established between external sphere 12 and internal sphere 16 and is, in the preferred embodiment, at least partially filled with fluid 14. This fluid 14 facilitates the free movement of internal sphere 16 within the confines of external sphere 12. Fluid 14 may preferably be a lubricant type fluid with low viscosity that facilitates this free movement of the sphere-in-sphere configuration.

Orientation stabilizer 18 in the embodiment shown in FIG. 1 is simply a weighted section of internal sphere 16. Stabilizer 18 is fixed in one region of internal sphere 16 so as to preference the orientation of the sphere and its internal components in an "upright" position with respect to gravity. It is only important that this orientation be maintained as a reference orientation with which measured data may be compared. Other means for maintaining a specific three-dimensional orientation for internal sphere 16 and its contents are envisioned. In some configurations and environments it may be sufficient to partially fill the spatial gap between spheres 16 and 12 with fluid 14 so as to form a bubble that will, again by gravitational influence, tend to remain at the top of the sensor (pointing away from the earth) and thereby maintain internal sphere 16 in a consistent and/or known orientation.

Positioned within internal sphere 16, preferably above orientation stabilizer 18, is an electronics platform 22 which retains the various components necessary to operate the fluidized sensor 10 of the present invention. Platform 22 may simply be a printed circuit board that is fixed to the inside surface of internal sphere 16 at a number of points sufficient to maintain the platform in a fixed relationship to sphere 16. Positioned on platform 22 are a tri-axial inertial sensor 20, a data processor 26, which incorporates a clock or timekeeping component, a data recording device 24, and a power source 28. As indicated above, many of these components are provided by existing miniature sensor systems marketed under the Motes® line of products by Crossbow Technologies, Inc. of San Jose, Calif.

With the orientation and configuration shown in FIG. 1, those skilled in the art will recognize that internal sphere 16 is free to move within the confines of external sphere 12. As external sphere 12 may rotate under the influence of the flow of material around it, internal sphere 16 is preferenced to remain in a fixed orientation upright within the confines of external sphere 12. It is recognized that an important feature of internal sphere 16 is its inertial mass which tends to resist rotational movement about each axis directed through the center of the sensor. This inertial mass may be provided primarily by orientation stabilizer 18 but also derives from the balance of the components contained within internal sphere 16. The critical stabilizing aspect for internal sphere 16 is for the angle at which tri-axial inertial sensor 20 is positioned with regard to the three-dimensional movement of the fluidized sensor 10 as a whole to be maintained consistent. As long as the angle of orientation for tri-axial inertial sensor 20 is maintained in a plane generally parallel to the surface of the earth, i.e. orthogonal to the direction of the force of gravity, the sensor system is capable of accurately tracking movement of the fluidized sensor in three dimensions.

The external sphere 12, shown enclosing the internal sphere 16, has an inside diameter $D_2$ that is incrementally larger than the outside diameter $D_1$ of the internal sphere 16. External sphere 12 retains a generally smooth, unobstructed inside surface and fully encloses the internal sphere 16. A quantity of fluid 14 fills this spatial gap between the outside surface of internal sphere 16 and the inside surface of external sphere 12. In this manner, internal sphere 16 is free to rotate in any direction within external sphere 12 under the influence of the internal orientation stabilizer 12.

A key to the present invention is the ability to stabilize the accelerometer. Without stabilization, the fluidized sensor would tumble, spin, or spiral as it moves within the pipeline, giving irrelevant profile readings. However, as the design above indicates, the accelerometer and CPU device are enclosed in an internal sphere. This internal sphere is, as indicated, enclosed within an external sphere, and is free to rotate within the same. The minimized space between the internal and external spheres is filled with a liquid which acts as a lubricant between the outer surface of the internal sphere and the inner surface of the external sphere.

The internal sphere may then be made buoyant, as for example with a weight on the bottom or a pocket of air on top, to stabilize the internal sphere in an upright position with respect to gravitational force direction. In this manner, as the external sphere bounces and spins as it moves down the pipeline, the internal sphere generally remains in a stationary orientation. Utilizing the above described principle in the present invention, the inertial system is able to measure only translational accelerations, eliminating the irrelevant tumbling measurements.

Figure 2A:
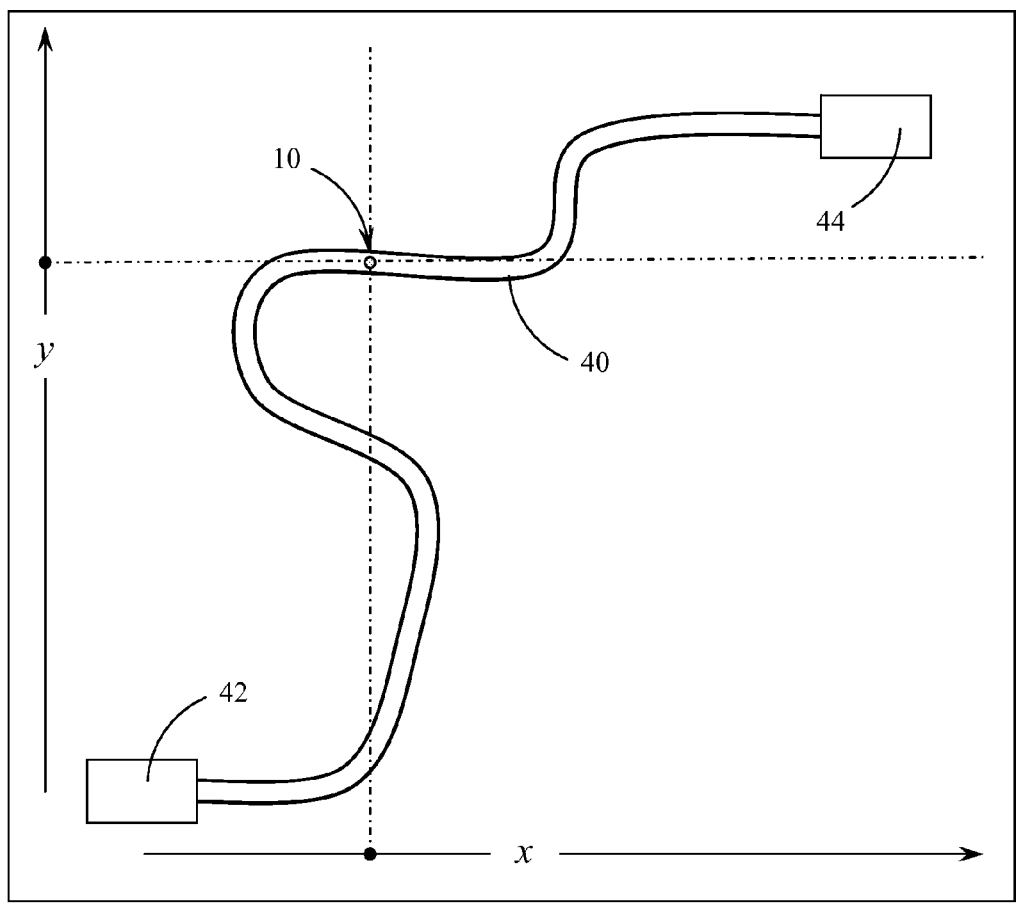
FIGS. 2A & 2B are schematic views (from above and from the side) of the system of the present invention operating in conjunction with a pipeline to be mapped showing movement in three dimensions.
Figure 2B:
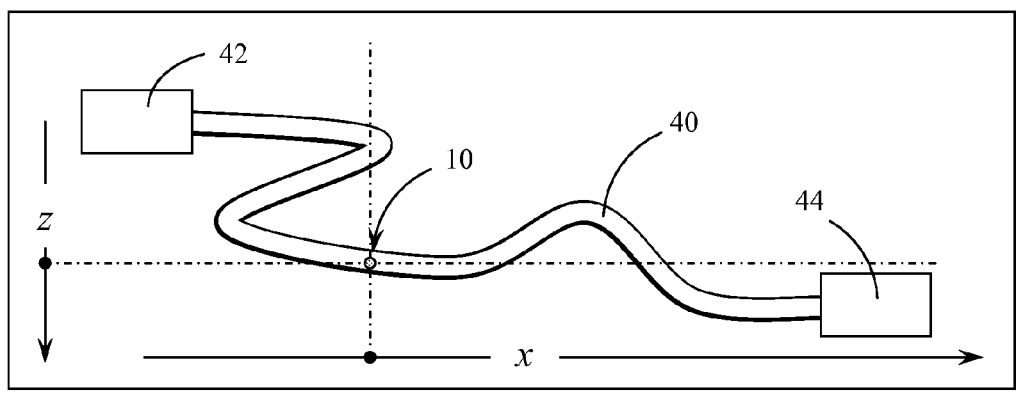

Reference is now made to FIGS. 2A & 2B for a brief description of the manner of operating the system of the present invention. FIGS. 2A & 2B disclose (in two separate top and side views) an example of a pipeline 40 extending between access points 42 and 44. A first view in FIG. 2A shows pipeline 40 as viewed from above (for example) providing an x and y plane of reference for the position of pipeline 40 as it extends between end points 42 and 44. The second view shown in FIG. 2B provides a perspective rotated 90° in a manner that discloses the x coordinate positional axis as well as a z coordinate positional axis orthogonal to the x and y axes displayed in FIG. 2A. Between these two views, a complete three-dimensional profile of the position of pipeline 40 is established.

Fluidized sensor 10 is placed within pipeline 40 at initial entry point 42 and, after activation, is allowed to progress through pipeline 40 to end point 44. In the process of movement through pipeline 40, inertial measurements track the x and y coordinate movements as well as the elevational or z coordinate movements by collecting the acceleration data necessary to establish these distance (positional) numbers. The manner in which the collected data is translated into positional data is described in more detail below.

The inertial sensor 10 travels through the entire length of pipeline 40 to its endpoint 44 where the sensor is removed from the pipeline and prepared for data download. The process of downloading data from the sensor may include a wireless communication link between an external data processing device and the internal electronics described above. It may also be practical and cost-effective to simply destroy the external and internal spherical enclosures to directly access the stored data in the on-board data recording device. A further alternative may be to provide access ports through the walls of both the external and internal spheres to a connection point in association with the electronics platform within the internal sphere. In any case, the data gathered by the sensor in its motion through the pipeline is downloaded for integration processing and conversion into positional information.

Figure 3:
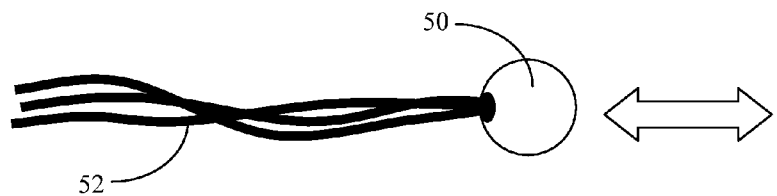
FIG. 3 is a side view of an alternate embodiment of the present invention showing the use of components intended to stabilize the orientation of the sensor in its movement through the pipeline to be mapped.

A further option in the application of the present invention is to utilize a tail-stabilized sensor. This option is more relevant to substantially miniaturized sensors, whose lack of mass would keep them afloat and off the pipe walls. Having a tail would stabilize the sensor much like feathers on an arrow and keep it relatively upright as it floats through the pipeline. It is also mentioned here that the tails may also act as power generators if constructed from flexible piezoelectric material, such as Polyvinylidene Fluoride (PVDF). As a note, where the sensor is propelled by fluid flow within the pipeline, the tail would actually be the nose as the flow would direct it ahead of the sensor. Reference is made to FIG. 3 for an example of this alternative embodiment of the present invention wherein sensor 50 is shown fitted with stabilizer tail 52.

In general, to utilize the device of the present invention, the inertial sensor is turned on and begins to make readings. The CPU device collects and stores these readings in the on-board data recording device and gives a time stamp to the recordings. The sensor is then placed in the pipeline where the gas or fluid flow carries it along the pipeline passage. The CPU continues to record acceleration (A) in three dimensions with respect to time (t) to yield $A_n(t)$, where n refers to an axis (n=x, y, or z). The first integral of A with respect to t yields velocity V and the second integral yields a position value n (again, where n refers to an axis x, y, or z.). Applying this integration process to each reading, which corresponds to a different axis, yields positions in three dimensions (x, y, and z).

As an example, if the sensor is turned on and dropped for two seconds (assuming near sea level and not reaching terminal velocity) the accelerometer would detect a $-9.8$ m/s$^2$ acceleration in the vertical axis (z). The output, taken every second, would look similar to the following table.

TABLE 1

| Time (s) | $A_x$ (m/s$^2$) | $A_y$ (m/s$^2$) | $A_z$ (m/s$^2$) |
|---|---|---|---|
| 0 | 0 | 0 | 0 |
| 1 | 0 | 0 | -9.8 |
| 2 | 0 | 0 | -9.8 |
| 3 | 0 | 0 | -9.8 |

Integrating the acceleration with respect to time yields a velocity (Equation 1). Position may then be calculated by integrating the velocity with respect to time as well (Equation 2).

$$V = \int A \, dt = At + v_0 \quad [1]$$

$$X = \int V \, dt = \tfrac{1}{2} A t^2 + v_0 t + X_0 \quad [2]$$

Figure 4A:
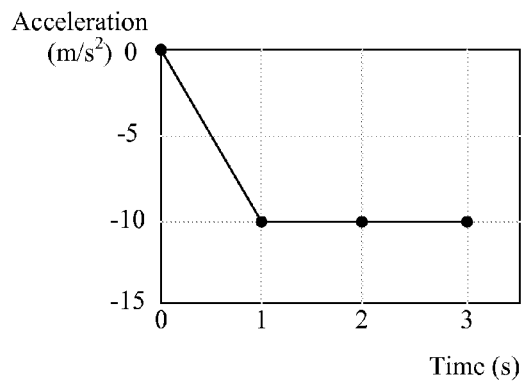
FIGS. 4A, 4B, and 4C provide simple graphic examples of integrated data of the type recorded by the system of the present invention, from which may be determined the path of the pipeline.
Figure 4B:
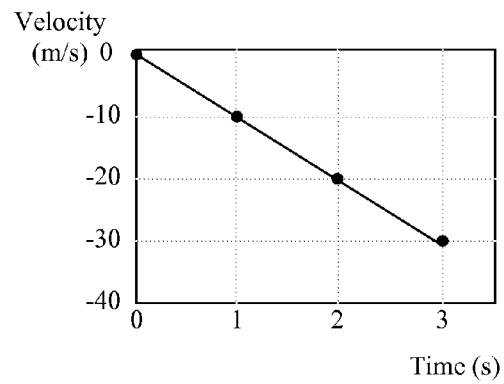
Figure 4C:
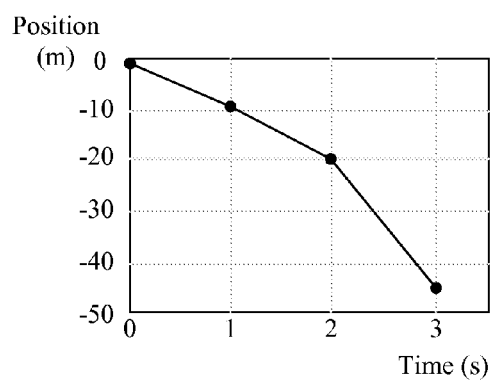

Plotting these functions over time results in the graphs shown in FIGS. 4A, 4B, and 4C. Matching the positions in all axes at each time will give as a result a three-dimensional track of the path of the pipeline.

Although the present invention has been described in terms of the foregoing preferred embodiments, this description has been provided by way of explanation only, and is not intended to be construed as a limitation of the invention. Those skilled in the art will recognize modifications of the present invention that might accommodate specific environments. Such modifications as to size, and even configuration, where such modifications are merely coincidental to the specific application do not necessarily depart from the spirit and scope of the invention.

I claim:

1. An apparatus for facilitating the mapping of a pipeline, the pipeline containing a gas, a liquid, or a liquid/gas mixture, the apparatus comprising:
   an internal sphere having an outer diameter, a generally smooth unobstructed outer surface, and an internal orientation stabilizer, the internal sphere enclosing;
      a tri-axial inertial sensor;
      a data recording device;
      a power source; and
   an external sphere having an inner diameter incrementally larger than the outer diameter of the internal sphere and a generally smooth unobstructed inner surface, the external sphere fully enclosing the internal sphere.

2. The apparatus of claim 1 further comprising a quantity of fluid filling a spatial gap between the outer surface of the inner sphere and the inner surface of the external sphere so as to facilitate omni-directional free rotational motion of the internal sphere within the external sphere.

3. The apparatus of claim 1 further comprising a data download device for retrieving data stored in the data recording device.

4. The apparatus of claim 3 wherein the data download device comprises a memory storage device physically removable from the inner sphere.

5. The apparatus of claim 3 wherein the data download device comprises a wireless communication system, the wireless system comprising a data signal transmitter positioned within the inner sphere and a data signal receiver positioned outside of the external sphere.

6. The apparatus of claim 1 wherein the internal sphere further comprises an electronic time keeping device.

7. The apparatus of claim 1 wherein the internal sphere further comprises an electronic data processing device.

8. The apparatus of claim 1 wherein the internal orientation stabilizer comprises a gravitationally influenced mechanism for rotating the internal sphere.

9. The apparatus of claim 8 wherein the gravitationally influenced mechanism comprises a weight fixed within one hemisphere of the internal sphere.

10. The apparatus of claim 8 further comprising a quantity of fluid filling a spatial gap between the outer surface of the inner sphere and the inner surface of the external sphere so as to facilitate omni-directional free rotational motion of the internal sphere within the external sphere, and the gravitationally influenced mechanism comprises a gas-filled chamber positioned within one hemisphere of the internal sphere.

* * * * *